(12) United States Patent
Paradis

(10) Patent No.: US 11,772,726 B2
(45) Date of Patent: Oct. 3, 2023

(54) APPARATUS AND METHODS FOR ALIGNING HEADLAMP ASSEMBLIES

(71) Applicant: Toyota Motor Engineering & Manufacturing North America, Inc., Plano, TX (US)

(72) Inventor: Alexander L. Paradis, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 17/497,626

(22) Filed: Oct. 8, 2021

(65) Prior Publication Data
US 2023/0112973 A1 Apr. 13, 2023

(51) Int. Cl.
B62D 65/16 (2006.01)
B60Q 1/06 (2006.01)

(52) U.S. Cl.
CPC .............. B62D 65/16 (2013.01); B60Q 1/06 (2013.01)

(58) Field of Classification Search
CPC .................................. B62D 65/16; B60Q 1/06
USPC ............................................ 29/407.01–407.1
See application file for complete search history.

(56) References Cited

U.S. PATENT DOCUMENTS

| | | | |
|---|---|---|---|
| 2,557,590 A | 6/1951 | Raymond et al. | |
| 3,868,500 A * | 2/1975 | Martin | B60Q 1/06 362/469 |
| 4,075,469 A | 2/1978 | Alphen | |
| 4,733,334 A * | 3/1988 | Krey | B60Q 1/06 362/532 |
| 5,121,303 A * | 6/1992 | Shirai | B60Q 1/0683 362/462 |
| 5,446,632 A * | 8/1995 | Childs | B60Q 1/0683 362/463 |
| 5,586,393 A * | 12/1996 | Pherigo | B60Q 1/0686 362/463 |
| 11,359,799 B1 * | 6/2022 | Yang | F21V 19/02 |

(Continued)

FOREIGN PATENT DOCUMENTS

| | | |
|---|---|---|
| CN | 202923475 U | 7/1977 |
| CN | 104802697 A | 7/2015 |

(Continued)

OTHER PUBLICATIONS

MEMS for tilt measurement and headlight leveling, Fierce Electronics, (https://www.fierceelectronics.com/components/mems-for-tilt-measurement-and-headlight-leveling), Oct. 1, 2008.

*Primary Examiner* — Sarang Afzali
*Assistant Examiner* — Darrell C Ford
(74) *Attorney, Agent, or Firm* — Dinsmore & Shohl LLP

(57) ABSTRACT

Methods for aiming a headlamp assembly of a vehicle having an aiming bracket and a sensor coupled to the aiming bracket. The method includes adjusting the aiming bracket such that an optical axis of the optical assembly inside of the headlamp assembly is parallel to a predetermined axis). The method further includes storing an output of the sensor when the optical axis is parallel to the predetermined axis. The method further includes installing the headlamp assembly into the vehicle. The method further includes adjusting the aiming bracket such that the output of the sensor equals the stored output.

9 Claims, 6 Drawing Sheets

(56) References Cited

U.S. PATENT DOCUMENTS

| | | | | |
|---|---|---|---|---|
| 2007/0058387 | A1* | 3/2007 | Takada | F21S 41/657 |
| | | | | 362/539 |
| 2007/0089308 | A1* | 4/2007 | Jeon | G01M 11/067 |
| | | | | 33/288 |
| 2011/0309746 | A1* | 12/2011 | Eckel | B60Q 3/43 |
| | | | | 315/297 |
| 2013/0308326 | A1* | 11/2013 | Kasaba | B60Q 1/10 |
| | | | | 362/465 |
| 2014/0268850 | A1* | 9/2014 | Marley | F21S 41/336 |
| | | | | 362/516 |
| 2015/0308651 | A1* | 10/2015 | Herbers | B60Q 1/0683 |
| | | | | 362/516 |
| 2017/0174127 | A1* | 6/2017 | Ramdass | B60Q 11/002 |
| 2018/0288854 | A1* | 10/2018 | Schröder | H05B 47/19 |
| 2019/0359119 | A1* | 11/2019 | Brouillard-Turgeon | |
| | | | | B60Q 1/0483 |
| 2020/0132270 | A1* | 4/2020 | Ford | F21S 41/151 |
| 2020/0158598 | A1* | 5/2020 | Corghi | G01M 11/061 |
| 2021/0016705 | A1* | 1/2021 | Hartisch | G06V 20/582 |
| 2023/0098061 | A1* | 3/2023 | Yamasaki | B60Q 1/06 |
| | | | | 362/512 |

FOREIGN PATENT DOCUMENTS

| | | | |
|---|---|---|---|
| CN | 108674301 | A | 10/2018 |
| FR | 2336294 | A2 | 7/1977 |
| KR | 20150055396 | A | 5/2015 |

\* cited by examiner

APPARATUS AND METHODS FOR ALIGNING HEADLAMP ASSEMBLIES

TECHNICAL FIELD

The present specification generally relates to apparatus and methods for vehicle headlamp assemblies and, more specifically, apparatus and methods for aiming vehicle headlamp assemblies.

BACKGROUND

Conventional vehicle headlamp assemblies undergo various alignment processes during production. These processes may be subject to human error and are timely. Additionally, each process inherently includes some measurement inaccuracy, which results in large aim variation after completing the various processes.

Accordingly, a need exists for improved headlamp assemblies that are subject to less human error and are less costly.

SUMMARY

In one embodiment, a method for aiming a headlamp assembly of a vehicle having an aiming bracket and a sensor coupled to the aiming bracket. The method includes adjusting the aiming bracket such that an optical axis of the optical assembly inside of the headlamp assembly is parallel to a predetermined axis. The method further includes storing an output of the sensor when the optical axis is parallel to the predetermined axis. The method further includes installing the headlamp assembly into the vehicle. The method further includes adjusting the aiming bracket such that the output of the sensor equals the stored output.

In another embodiment, an apparatus for a headlamp assembly for a vehicle includes an aiming bracket, a sensor, and an electronics control unit. The aiming bracket is configured such that adjusting the aiming bracket adjusts an optical axis of the headlamp assembly. The sensor is coupled to the aiming bracket and is configured to output a value associated with the optical axis. The electronics control unit communicatively coupled to the sensor and configured to receive the value from the sensor.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
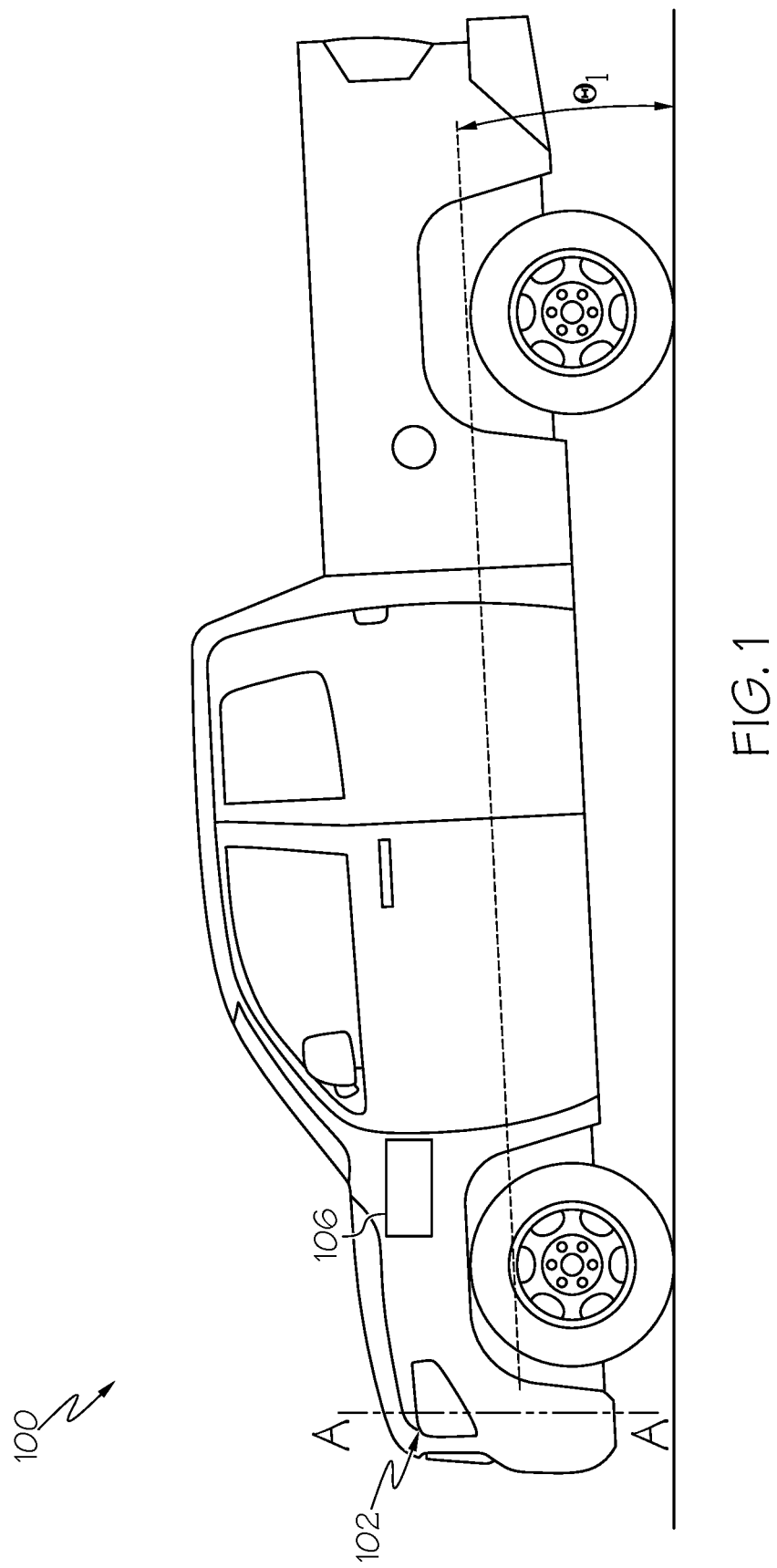
FIG. 1 schematically depicts a headlamp assembly in a vehicle at a first angle, according to one or more embodiments shown and described herein.

Embodiments described herein are directed to a headlamp assembly having a sensor capable of detecting pitch differences of the headlamp assembly. By detecting the pitch differences, the number of steps during the pre-production, production, audits, and service for aligning the headlamp assemblies low and high beam optical axis are reduced and are less prone to human error. These factors allow for better control of the aim of the headlamp.

The headlamp assembly includes an aiming bracket and a sensor positioned on the aiming bracket. The sensor is configured to store a value when an optical axis of the headlamp assembly is parallel to a predetermined axis of the low and high beam optical assembly. After installing a headlamp assembly into a vehicle, the aiming bracket is then adjusted until an output of the sensor equals the stored value. Various embodiments of the method and apparatus and the operation of the method and apparatus are described in more detail herein. Whenever possible, the same reference numerals will be used throughout the drawings to refer to the same or like parts.

Referring now to FIG. 1, a vehicle 100 at a first angle $\theta_1$ is illustrated, according to one or more embodiments described herein. The first angle $\theta_1$ is defined by comparing a difference of an axis extending along a length of the vehicle 100 relative to the level ground surface. In other words, the first angle $\theta_1$ defines a difference in pitch along the length of the vehicle 100 relative to the level ground. The vehicle 100 may define the first angle $\theta_1$ when at factory specifications (e.g., factory set tire pressure, fluid levels, or suspension) at a first vehicle condition. In the first vehicle condition, any vehicle condition that may alter the first angle $\theta_1$ has a predetermined value, setting or first position.

As discussed in greater detail herein, the vehicle conditions include any factors that alter the pitch of the vehicle (e.g., fluid level of the vehicle, suspension setting).

The vehicle 100 includes a headlamp assembly 102 which illuminates the area ahead of the vehicle 100. As discussed in greater detail herein, the headlamp assembly 102 defines a cut-off line and an optical axis in which the headlamp assembly 102 directs light generated by a light source of the headlamp assembly 102. In conventional systems, the optical axis may be offset relative to a predetermined direction due to the pitch of the vehicle 100.

Figure 2:
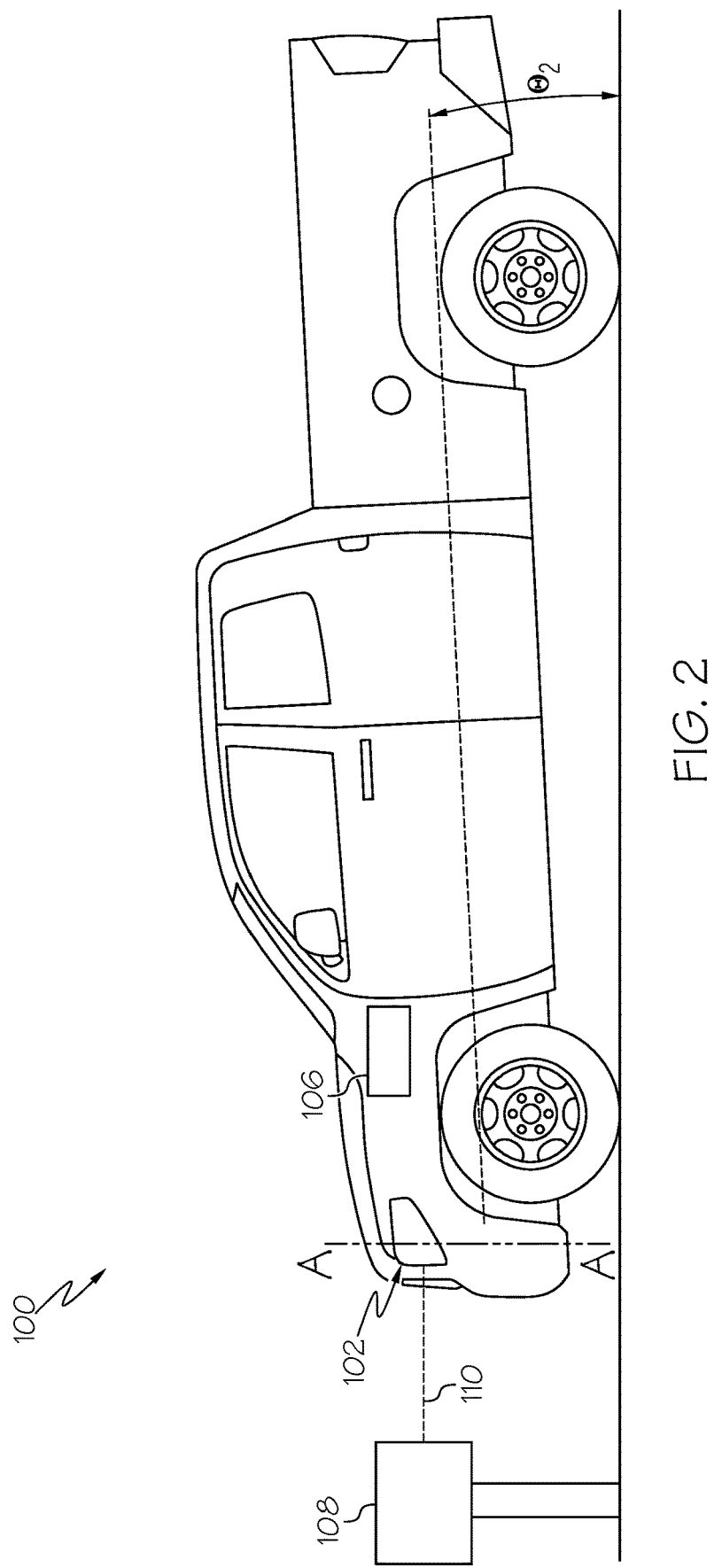
FIG. 2 schematically depicts a headlamp assembly in a vehicle at a second angle, according to one or more embodiments shown and described herein.

Referring now to FIG. 2, the vehicle 100 at a second angle $\theta2$ is illustrated, according to one or more embodiments described herein. The second angle 2, is defined by comparing a difference of the axis extending along the length of the vehicle 100 relative to the level ground surface (i.e., the same process the first angle $\theta_1$ is measured). The second angle $\theta_2$ is determined when the vehicle is defined as having various vehicle conditions at a second vehicle condition. In the second vehicle condition, any vehicle condition that may alter the second angle $\theta_2$ has a predetermined value, setting or first position. For example, the second angle $\theta_2$ may be 1° when the vehicle 100 does not contain fluids. In another example, the second angle $\theta_2$ may be 1.2° when the vehicle 100 has 100 lbs. of additional equipment and a fill fuel gage. To return the second angle $\theta_2$ to a predetermined range, the headlamp assembly 102 is aligned. In some embodiments, the predetermined range is equal to 0.00°+/−0.15, In some embodiments, the predetermined range is equal to 0.00°+/−0.05. In some embodiments, the predetermined range is equal to 0.00°+/−0.25.

As discussed in greater detail below, a low and high beam optical assembly (herein referred to as an optical assembly 201 of the headlamp assembly 102) emits a light pattern that illuminates the area in front of the headlamp assembly 102 during operation of the vehicle 100. The light pattern consisting of a cut-off line, notch, hotspot, foreground, and various other characteristics herein will be represented as the optical axis 204. The optical axis 204 emitted from the headlamp assembly 102 may be detected using a Visually Optically Aimed (VOA) machine 108 (e.g., such as a photometer). In some embodiments, the VOA machine 108 has a measurement accuracy of 0.01° to 0.03°, inclusive. In some embodiments, the VOA machine 108 has a measurement accuracy of 0.03° to 0.05°, inclusive. The vehicle 100 is separated from the VOA machine 108 by a specified length 110. In some embodiments, the specified length 110 is equal to 10 inches to 40 inches, inclusive. In some embodiments, the specified length 110 is equal to 100 inches to 300 inches, inclusive. In some embodiments, the specified length 110 is equal to 900 inches to 1000 inches, inclusive.

Figure 3:
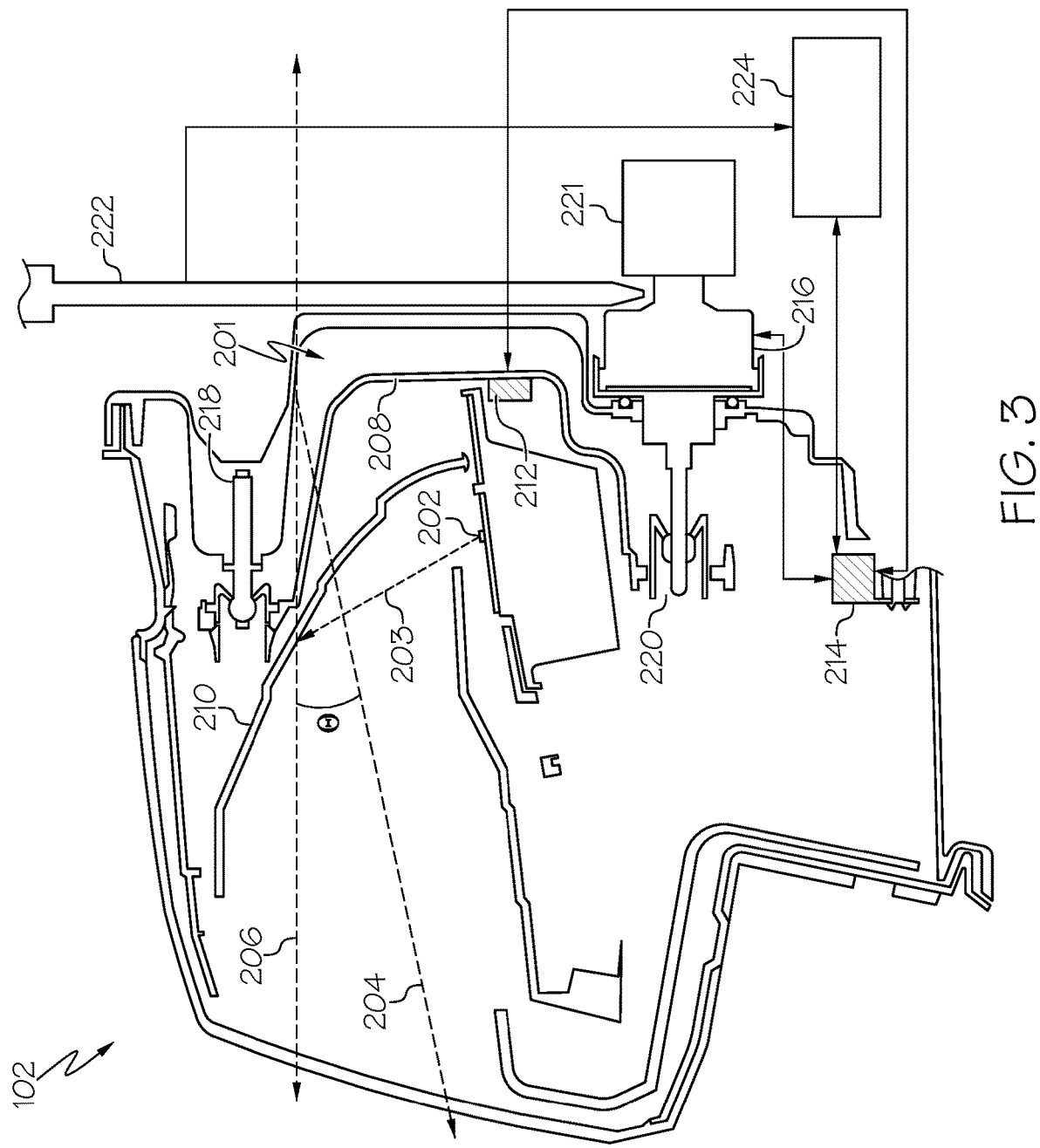
FIG. 3 schematically depicts the headlamp assembly taken along plane A-A in FIG. 1 and FIG. 2.

Referring now to FIG. 3, the headlamp assembly 102 taken along plane A-A in FIG. 1 and FIG. 2 is illustrated, according to one or more embodiments described herein. Plane A-A extends perpendicularly to the shown longitudinal axis in FIG. 1 and FIG. 2. The optical assembly 201 includes a light source 202 (e.g., light bulb). The light source 202 may be a light emitting diode (LED), halogen light bulbs, xenon light bulbs or any other suitable light source. The light source 202 is configured to emit light cone 203, which after being reflected, is emitted out of the headlamp assembly 102 along an optical axis 204. The optical axis 204 is the direction in which the headlamp assembly 102 emits light during operation of the vehicle. It is advantageous for the optical axis 204 to be positioned within a predetermined range with respect to a predetermined axis 206, to increase the area illuminated ahead of the vehicle 100. In some embodiments, the predetermined axis 206 is between −0.10° and 0.10° with respect to a horizontal axis (e.g., parallel to a level ground surface of the vehicle 100). In some embodiments, the predetermined axis 206 is between −0.50° and 0.50° with respect to the horizontal axis. In some embodiments, the predetermined axis 206 is between −0.1.00° and 1.00° with respect to the horizontal axis.

A difference between the optical axis 204 and the predetermined axis 206 defines an optical axis angle $\theta$. The optical axis 204 is aligned (e.g., adjusted) so that the optical axis angle $\theta$ is within a predetermined range.

In some embodiments, the predetermined range is equal to 0.00°+/−0.15. In some embodiments, the predetermined range is equal to 0.00°+/−0.05. In some embodiments, the predetermined range is equal to 0.00°+/−0.25.

The optical assembly 201 further includes an aiming bracket 208 and a reflector 210. The light source 202 emits the light cone 203 onto the reflector 210. The reflector 210 then reflects the emitted light out of the headlamp assembly 102, thereby defining the optical axis 204. The aiming bracket 208 is fixedly secured to the reflector 210 and is configured to adjust a position of the reflector 210. Further, the aiming bracket 208 is operatively coupled to any component of the headlamp assembly 102 (e.g., aiming screws, leveling motors) that adjusts the optical axis 204. In this way, the optical axis 204 is configured to be adjusted by adjustment of the aiming bracket 208. In some embodiments, the reflector 210 and the aiming bracket 208 are combined into the same component.

The headlamp assembly 102 further includes a sensor 212 fixedly secured to the aiming bracket 208 such that the sensor 212 is inhibited from moving with respect to the aiming bracket 208. The sensor 212 is configured to detect an angle of the aiming bracket 208 and, therefore, an angle of the optical axis 204. During the production of the headlamp assembly 102, the aiming bracket 208 is adjusted so that the optical axis 204 is parallel to the predetermined axis 206. The VOA machine 108 detects the angle of the optical axis 204 and provides a reading as to what the detected angle output is. The detected angle output when the optical axis 204 is parallel to the predetermined axis 206 is then stored in the memory of an ECU 214 of the headlamp assembly 102. In some embodiments, the optical axis 204 is parallel to the predetermined axis 206 when the optical axis angle $\theta$ is within the predetermine range. In some embodiments, the predetermined range is equal to 0.00°+/−0.15, In some embodiments, the predetermined range is equal to 0.00°+/−0.05. In some embodiments, the predetermined range is equal to 0.00°+/−0.25.

The sensor 212 may be a gyroscope, an inertial measurement unit, an inclinometer, microelectromechanical system, or any other suitable sensor configured to detect angular displacement. The sensor 212 outputs a value indicative of an angular difference from a known reference axis. After the alignment is complete, an output value of the sensor 212 is then stored. By recording the output value after the alignment, the headlamp assembly 102 has a known reference line that may be easily returned to by considering the current output value of the sensor. Accordingly, any deviation from the stored output is detected by the sensor 212. Following the installation of the headlamp assembly 102 into the vehicle 100, the aiming screw 216 is adjusted to return the output value of the sensor to be within the predetermined range. In some embodiments, the sensor 212 is used in pre-production of the headlamp assembly 102 to determine vehicle conditions offsets based on the vehicle conditions applied onto the vehicle 100. The vehicle conditions affect the pitch of the vehicle 100, thereby effecting the optical axis 204 of the headlamp assembly 102.

The headlamp assembly 102 further includes an electronic control unit (ECU) 214. The ECU 214 is communicatively coupled to the sensor 212 and is configured to receive the output value from the sensor 212. In some embodiments, the ECU 214 is communicatively coupled to an ECU 106 of the vehicle 100. In other embodiments, the ECU 214 is the ECU 106 of the vehicle 100.

In some embodiments, a pitch of the optical axis 204 is adjusted by rotating an aiming screw 216. The aiming screw 216 is coupled to the optical assembly 201 and is configured to adjust the position of the aiming bracket 208, the reflector 210, and therefore, the optical axis 204, with respect to the predetermined axis 206. The aiming screw 216 is configured to rotate in order to adjust the position of the aiming bracket 208, thereby facilitating for the optical axis 204 to be aligned. The optical assembly 201 rotates about three aiming devices 220 (e.g., socket and pivot ball), 218 (e.g., socket and pivot ball), and a third aiming device similar to that of 220 or 218 spaced apart in a vehicle width direction. The combination of these three devices provide an axis of rotation for the aiming screw 216 to adjust the optical axis 204 so that it may be parallel to the predetermined axis 206.

In some embodiments, the optical assembly 201 further includes an aiming motor 221 communicatively coupled to the ECU 214; the ECU 106, or another leveling control device. The aiming motor 221 is coupled to the aiming screw 216 and is configured to rotate the aiming screw 216 in order to adjust the position of the aiming bracket 208. After receiving the output value from the sensor 212, the ECU 214 provides a signal to the aiming motor 216. The signal is indicative of the required movement of the aiming bracket 208 by the aiming motor 216 in order to align the optical axis 204 parallel to the predetermined axis 206. In some embodiments, the aiming motor 221 and the aiming screw 216 are combined into a single component. In these embodiments, rotation of the aiming motor 221 directly adjusts the position of the aiming bracket 208.

As discussed above in FIG. 1 and FIG. 2, the vehicle 100 defines a pitch along the length of the vehicle 100 relative to the ground surface. The pitch may be dependent on whether the vehicle 100 is at predetermined vehicle settings (e.g., the first angle $\theta_1$ or if the vehicle 100 is at a loaded vehicle condition (e.g., the second angle $\theta_2$). Once the headlamp assembly 102 is installed into the vehicle 100, the pitch of the vehicle 100 will affect the optical axis angle θ. For example, if the optical axis angle θ was 0.10° prior to the installation of the headlamp assembly 102 into the vehicle 100 and the pitch of the vehicle is −1.00°, the optical axis angle 9 after the installation of the headlamp assembly 102 into the vehicle is now equal to −0.90°.

Accordingly, after the installation of the headlamp assembly 102 into the vehicle 100, the headlamp assembly 102 is then realigned such that the optical axis angle θ is within the predetermined range. In some embodiments, a realignment tool 222 is used to manually or automatically adjust the alignment screw 216 by rotating the alignment screw 216 until the output value of the sensor 212 is within the predetermined range to the stored output value of the sensor during the initial alignment of the headlamp assembly 102.

In some embodiments, the realignment tool 222 is automated. In these embodiments, the realignment tool 222 includes an auxiliary controller 224 (e.g., Central Processing Unit (CPU), electronic control unit (ECU), Digital Signal Processor (DSP)) which is communicatively coupled to the ECU 214 via a direct connection or a wireless connection. The ECU 214 provides a signal to the auxiliary controller 224 indicative of the output value of the sensor 212. The auxiliary controller 224 provides a signal indicative of the required adjustments for the headlamp assembly 100 to the realignment tool 222. The realignment tool 222 then automatically adjusts the position of the headlamp assembly 102 so that the output value of the sensor 212 is within the predetermined range.

Figure 4:
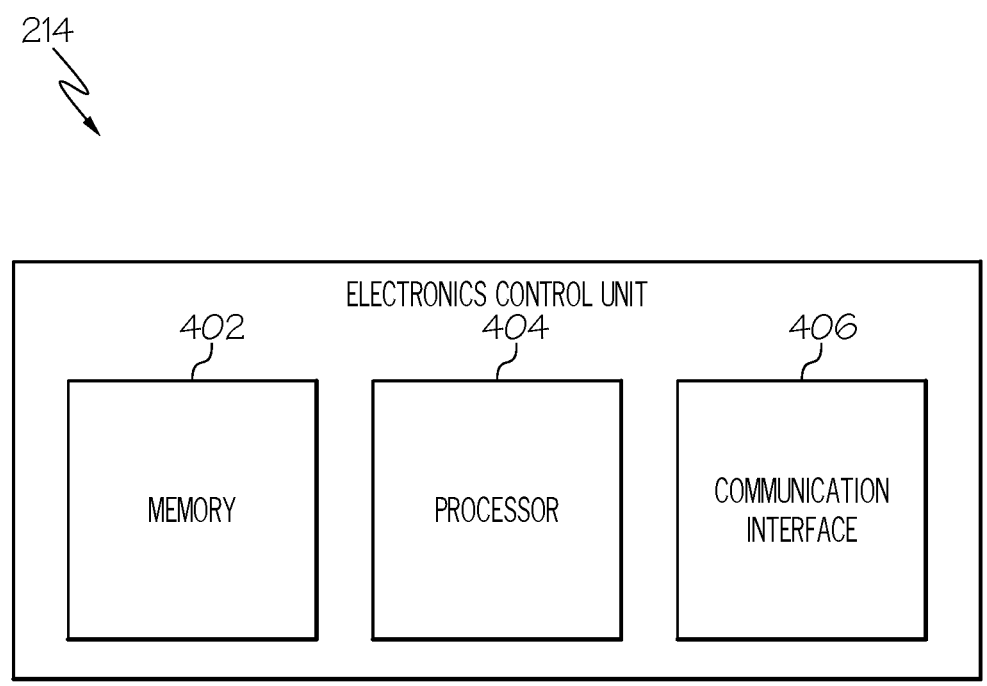
FIG. 4 schematically depicts an electronic control unit for a headlamp assembly, according to one or more embodiments shown and described herein.

Referring now to FIG. 4, the ECU 214 is illustrated according to one or more embodiments. The ECU 214 includes a memory 402, a processor 404, and a communication interface module 406. The memory 402 is a RAM (Random Access Memory), a ROM (Read Only Memory), or the like. The memory 402 stores executable programs relating to the operation of the headlamp assembly 102. The processor 404 is a CPU a DSP, or the like. The communication interface module 406 communicatively couples the ECU 214 to the other components of the headlamp assembly 102 or auxiliary components via wired or wireless connections. For example, the communication interface module 406 receives a signal from the sensor 212 indicative of the output value of the sensor 212. The communication interface module 406 provides the signal from the sensor 212 to the processor 404. The communication interface module 406 then receives a signal from the processor indicative of the output value of the sensor 212 to a display.

The processor 404 is configured to load executable programs in the memory 402 and execute the programs. These programs include, but are not limited to, receiving signals and providing signals to and from the other components of the headlamp assembly 102 via the communication interface module 406. The communication interface module 406 also facilitates for the processor module 404 to receive and provide signals from the auxiliary controller 224.

Figure 5:
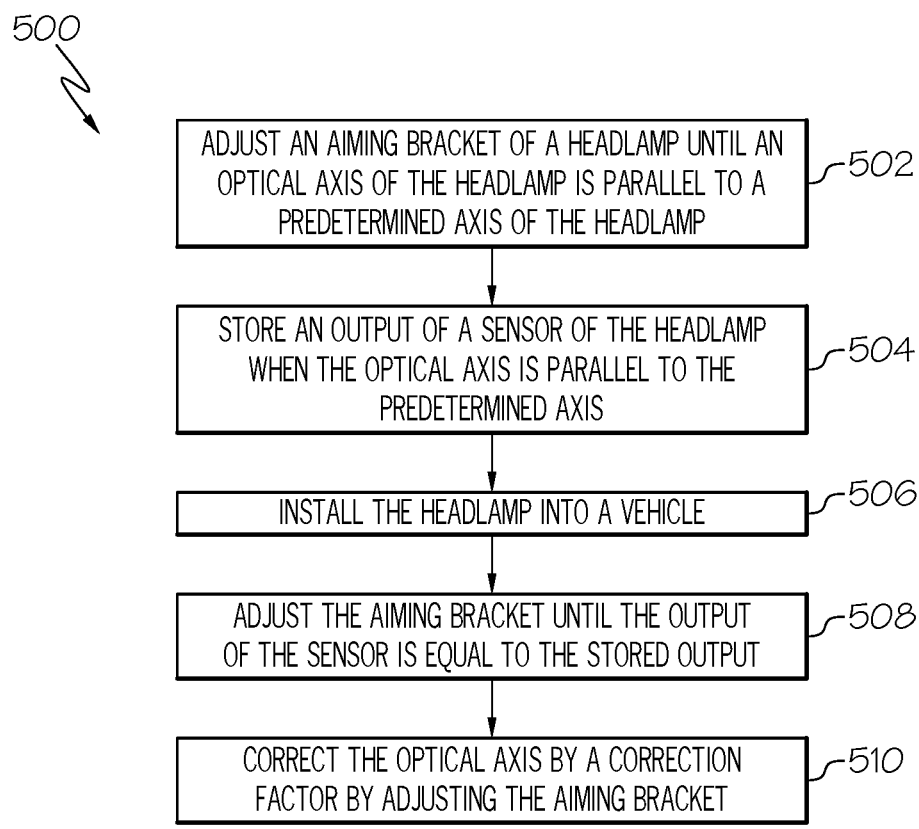
FIG. 5 schematically depicts a method of aligning an aiming bracket for a headlamp assembly, according to one or more embodiments shown and described herein.

Referring now to FIG. 5, a method 500 of aligning the headlamp assembly 102 is illustrated, according to one or more embodiments. The method 500 may be implemented during a production of the headlamp assembly (e.g., before installation into a vehicle), during an audit of the vehicle, or during service of the vehicle. At step 502, an aiming bracket 208 (e.g., such as aiming bracket 208) for a headlamp assembly (e.g., such as headlamp assembly 102) is adjusted. The adjustment occurs before the headlamp assembly is installed into the vehicle. The aiming bracket is adjusted until an optical axis (e.g., such as optical axis 204) of the headlamp assembly is parallel to a predetermined axis (e.g., such as predetermined axis 206). The optical axis may be measured visually using a VOA machine (e.g., such as the VOA machine 108). The aiming bracket may be adjusted by adjusting an aiming screw (e.g., such as aiming screw 216) or aiming motor (e.g., such as aiming motor 221) coupled to the aiming bracket and a reflector (e.g., such as reflector 210).

At step 504, an output value of a sensor (e.g., such as sensor 212) is stored when the optical axis is detected to be parallel to the predetermined axis. In some embodiments, the output value of the sensor when the optical axis is parallel to the predetermined axis is within the predetermined range. In some embodiments, the predetermined range is equal to 0.00°+1-0.15. In some embodiments, the predetermined range is equal to 0.00°+/−0.05. In some embodiments, the predetermined range is equal to 0.00°+1-0.25. The output value of the sensor may be stored in an ECU (e.g., such as ECU 214) of the headlamp assembly, an internal memory of the sensor, or an auxiliary memory.

At step 506, the headlamp assembly is installed into the vehicle. After installation, the headlamp assembly is no longer parallel to the predetermined axis due to a difference in pitch of the vehicle (e.g., such as the first angle $\theta_1$ illustrated in FIG. 1). The pitch may be due to the component and assembly tolerances of the vehicle. As explained in greater detail herein, the difference in pitch may also be due to the model and trim of the vehicle and/or various vehicle conditions. For example, the first angle $\theta_1$ may be equal to 1.0° and the optical axis angle θ may be equal to 0.05° before installation into the vehicle. Accordingly, the optical axis angle θ after being installed into the vehicle is now equal to 1.05°.

At step 508, the aiming bracket is adjusted until the output value of the sensor is back within the predetermined range to compensate for the pitch of the vehicle. As discussed in greater detail above, the headlamp assembly may be manually aligned through human intervention or through an automated process.

At step 510, the aiming bracket is adjusted by a correction value. The correction value places the optical axis into a corrected position (e.g., places the optical axis parallel to the predetermined axis by a predetermined amount) in response to the vehicle changing from a first position (e.g., such as vehicle 100 in FIG. 1) to a second position (e.g., such as vehicle 100 in FIG. 2).

Figure 6:
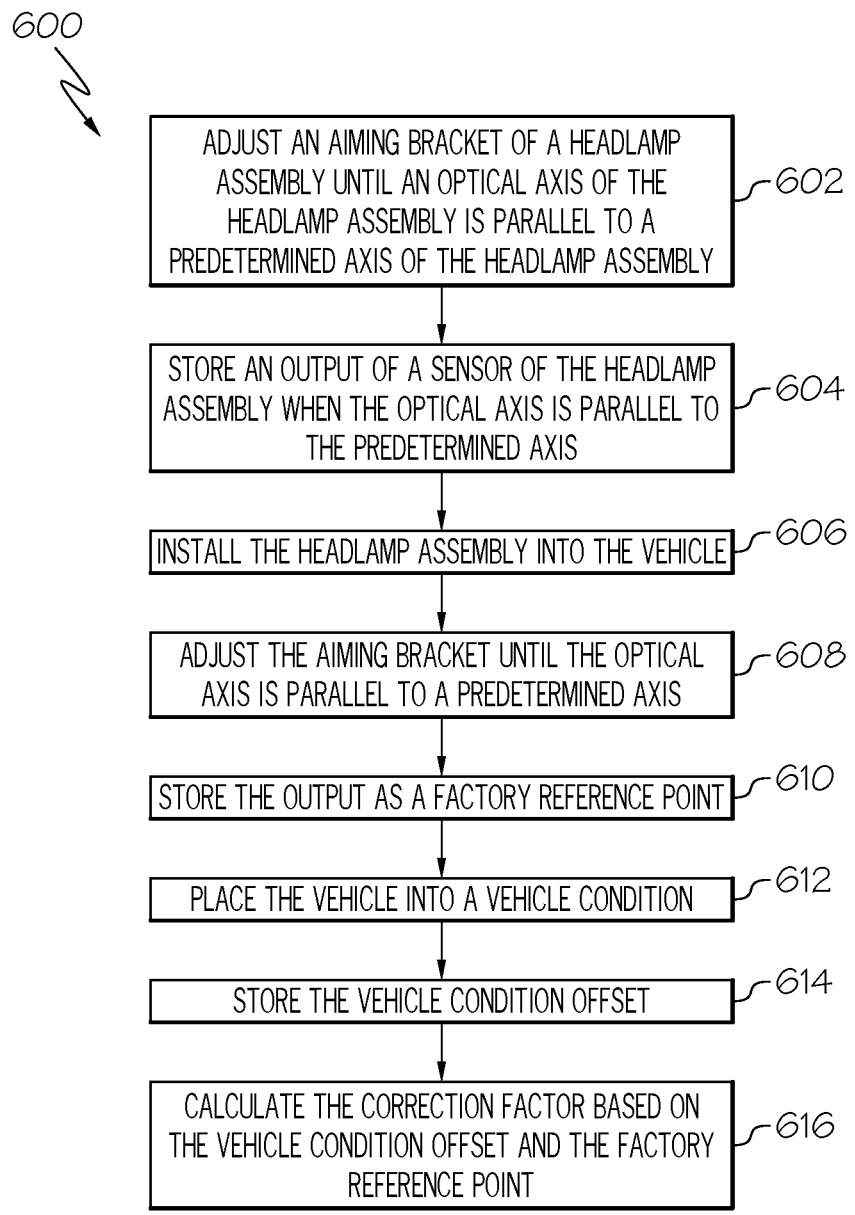
FIG. 6 schematically depicts another method of aligning an aiming bracket for a headlamp assembly, according to one or more embodiments shown and described herein.

Referring now to FIG. 6, a method 600 of calculating the correction value is illustrated, according to one or more embodiments. The method 600 may be implemented during pre-production of the vehicle and the headlamp assembly for a vehicle (e.g., before production of the vehicle and the headlamp assembly for the vehicle).

At step 602, an aiming bracket for the headlamp assembly is adjusted. The adjustment occurs before the headlamp assembly is installed into a vehicle. The aiming bracket is adjusted until an optical axis of the headlamp assembly is detected to be parallel to a predetermined axis. The optical sensor may be measured visually using a VOA machine or mechanically aimed. The aiming bracket may be adjusted by adjusting an aiming screw (e.g., such as aiming screw 216) or aiming motor (e.g., such as aiming motor 221) coupled to the aiming bracket and a reflector (e.g., such as reflector 210).

At step 604, an output value of a sensor is stored when the optical axis is parallel to the predetermined axis. In some embodiments, the output value of the sensor when the optical axis is parallel to the predetermined axis is within the predetermined range. In some embodiments, the predetermined range is equal to 0.00°+/−0.15. In some embodiments, the predetermined range is equal to 0.00°+/−0.05. In some embodiments, the predetermined range is equal to 0.00°+/−0.25. The output value of the sensor may be stored in an ECU of the headlamp assembly, an internal memory of the sensor, or an auxiliary memory.

At step 606, the headlamp assembly is installed into a vehicle. The vehicle (e.g., such as vehicle 100 in FIG. 1) is defined as the vehicle when at a first vehicle condition such as factory specifications, (e.g., factory set tire pressure, fluid levels, or suspension). After installation, the headlamp assembly is no longer parallel to the predetermined axis due to a difference in pitch of the first vehicle (e.g., such as the first angle $\theta_1$ illustrated in FIG. 1), The pitch may be due to the component and assembly tolerances of the vehicle.

At step 608, the aiming bracket is adjusted until the output value of the sensor is back within the predetermined range of the stored output value of the sensor to compensate for the pitch of the vehicle. As discussed in greater detail above, the headlamp assembly may be manually aligned through human intervention or through an automated process.

At step 610, the output value of the sensor is then stored as a factory reference point. At step 612, the vehicle is changed from the factory settings to a second setting (e.g., such as the vehicle 100 of FIG. 2). For example, in a first setting, the doors and the hood of the vehicle may be closed. In the second setting, the vehicle's doors and hood may be opened, thereby causing the pitch of the vehicle to change.

At step 614, the value of the vehicle condition output at the second setting is stored. At step 616, a correction factor is calculated by determining the difference from the factory, reference point determined in step 610 to the vehicle condition offset determined in step 614.

The method 600 is repeated in order to collect various vehicle condition offsets. Accordingly, during the alignment of the headlamp assembly within the vehicle (such as performed in step 508 of method 500), the headlamp assembly is aligned so to be returned to the predetermined range in addition to the vehicle condition offset. For example, if the vehicle is returned to 0.05° (which is within the predetermined range) and the vehicle is known to have a vehicle condition offset equal to 0.10°, the headlamp assembly may be adjusted so that it is equal to 0.15°+/−0.3°.

TABLE 1

| Vehicle Conditions | |
| Vehicle Conditions | |
| --- | --- |
| Model of the Vehicle | Trim of the Vehicle |
| Process for Visually Aiming a Headlamp Assembly | A Distance Away from the Headlamp Assembly during Visual Aiming |
| Levelness of the Surface the Vehicle is resting upon | Suspension Settling of the Vehicle |
| Tire Pressure for the Vehicle | Amount of Ambient Light during Visual Aiming |
| Position of the Vehicle's Hood | Position of the Vehicle's Doors |
| Driver and Passenger Weight in the Vehicle | Vehicle Cargo Weight |
| Fluid Levels of the Vehicle | Misc. Equipment or Accessories on the Vehicle |
| Shift Position of the Vehicle | Parking Brake Position for the Vehicle |
| Thermal Environment of the Vehicle | Mileage of the Vehicle |
| Headlamp Leveling Type and Position | Air Suspension Setting of the Vehicle |

Referring now to Table 1 illustrated above, various vehicle conditions for a vehicle, are shown. The various vehicle conditions exemplify various conditions a vehicle may be placed in, which affect the pitch of the vehicle or affect the measurement process. Accordingly, the vehicle conditions are not limited to the conditions illustrated in Table 1. In embodiments, each vehicle conditions may be individually measured using method 600. In other embodiments, vehicle conditions are combined.

Each vehicle parameter defines a first value, first setting, or first position when the vehicle is in the first position (e.g., as illustrated in FIG. 1). Additionally, each vehicle parameter defines a second value, second setting, or second position at the second setting. Each predetermined value, second setting, or second position, respectively, differ from the first value, first setting, or first position.

The vehicle conditions include at minimum the vehicle model and trim. However, additional vehicle conditions may be considered to increase the accuracy of the optical axis of the headlamp assembly. A vehicle condition that is considered is the process for aiming the headlamp assembly. For example, the process for visually aiming the headlamp assembly may include a camera or with a fixture. The process may also be done at varying distances. The amount of ambient light during visual aiming may also impact the process. Additionally, the surface levelness in which the vehicle is resting upon may vary based on whether the vehicle is on a normal road or a level surface plate. The suspension settling of the vehicle may differ based on the vehicle specific specifications, aftermarket changes, and the vehicle's stage in production. The tire pressure of the vehicle may differ based on whether the tire is at the recommended setting or a deviation from the recommended setting.

Additional vehicle conditions include the position of the vehicle's hood and doors. While the hood are doors are open, the weight of the vehicle is shifted, causing the vehicle's pitch to change. The weight and location of the driver, the passengers and the cargo may also shift the vehicle's pitch. The fluid levels (e.g., fuel, transmission fluid, washer fluid, motor oil) of the vehicle also shift the vehicle's pitch. Miscellaneous equipment or accessories (e.g., factory, dealer, or customer installed) installed on to the vehicle will also change the vehicle's pitch. Additionally, the shifting position (e.g., parking, reverse, neutral, or chive gear), the position of the parking brake (enabled, not enabled), the amount of time the vehicle has idled, the mileage of the vehicle, the vehicle's suspension (e.g., lifted, air suspension) will also all alter the vehicle's pitch.

From the above, it is to be appreciated that defined herein is a headlamp assembly having a sensor to detect pitch differences relative to a predetermined axis of the headlamp assembly in a vehicle. This results in the number of steps during the pre-production, production, during audits, and service for aligning the headlamp assembly to be reduced and to be less prone to human error.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

It will be apparent to those skilled in the art that various modifications and variations can be made to the embodiments described herein without departing from the scope of the claimed subject matter. Thus, it is intended that the specification cover the modifications and variations of the various embodiments described herein provided such modification and variations come within the scope of the appended claims and their equivalents.

What is claimed is:

1. A method for aiming a headlamp assembly of a vehicle, the headlamp assembly having an aiming bracket, an electronic control unit, and a sensor coupled to the aiming bracket, the method comprising:

adjusting the aiming bracket such that an optical axis of the headlamp assembly is parallel to a predetermined axis;

storing, using the electronic control unit, an output of the sensor when the optical axis is parallel to the predetermined axis;

installing the headlamp assembly into the vehicle after the output of the sensor is stored; and adjusting the aiming bracket such that the output of the sensor equals the stored output.

2. The method of claim 1, wherein the sensor measures an angle of the headlamp assembly with respect to the predetermined axis.

3. The method of claim 2, wherein the sensor is one of a gyroscope, an inertial measurement unit, an inclinometer, or a microelectromechanical system.

4. The method of claim 1 further comprising adjusting the aiming bracket based on a predetermined offset value after adjusting the aiming bracket such that the output of the sensor equals the stored output.

5. The method of claim 4, wherein the predetermined offset value is calculated based on a first vehicle loading condition and a second vehicle loading condition different from the first vehicle loading condition.

6. The method of claim 5, wherein the first vehicle loading condition and the second vehicle loading condition are based on a predetermined vehicle having a make and model corresponding to the vehicle in which the headlamp assembly are installed.

7. The method of claim 5, wherein the first vehicle loading condition and the second vehicle loading condition are based on at least one of an accessory weight of the vehicle and a fluid level for the vehicle.

8. The method of claim 1, wherein a tool is communicatively coupled to the electronic control unit configured to receive the output of the sensor, the tool configured to adjust the aiming bracket such that the output of the sensor equals the stored output.

9. The method of claim 1, wherein a motor is coupled to the aiming bracket and is communicatively coupled to the electronic control unit configured to receive the output of the sensor, the motor configured to adjust the aiming bracket such that the output of the sensor equals the stored output.

* * * * *

UNITED STATES PATENT AND TRADEMARK OFFICE
CERTIFICATE OF CORRECTION

| | |
|---|---|
| PATENT NO. | : 11,772,726 B2 |
| APPLICATION NO. | : 17/497626 |
| DATED | : October 3, 2023 |
| INVENTOR(S) | : Alexander L. Paradis |

It is certified that error appears in the above-identified patent and that said Letters Patent is hereby corrected as shown below:

On the Title Page

Item (57), abstract, Line(s) 5, after "predetermined", delete "axis)." and insert --axis.--, therefor.

In the Specification

In Column 4, Line(s) 23, delete "predetermine" and insert --predetermined--, therefor.

In the Claims

In Column 10, Line(s) 17, Claim 4, after "Claim 1", insert --,--, therefor.

Signed and Sealed this
Fifth Day of December, 2023

Katherine Kelly Vidal
*Director of the United States Patent and Trademark Office*